United States Patent [19]
Lewandowski et al.

[11] Patent Number: 6,136,899
[45] Date of Patent: Oct. 24, 2000

[54] SBR FOR ASPHALT CEMENT MODIFICATION

[75] Inventors: Laurand Henry Lewandowski, Kent; Daniel Frederick Klemmensen, Tallmadge, both of Ohio

[73] Assignee: The Goodyear Tire & Rubber Company, Akron, Ohio

[21] Appl. No.: 09/456,762

[22] Filed: Dec. 7, 1999

Related U.S. Application Data

[60] Provisional application No. 60/153,846, Sep. 14, 1999.
[51] Int. Cl.⁷ ..................................................... C08L 95/00
[52] U.S. Cl. ................................. 524/71; 524/59; 524/68
[58] Field of Search ................................... 524/59, 68, 71

[56] References Cited

U.S. PATENT DOCUMENTS

| | | | |
|---|---|---|---|
| 5,002,987 | 3/1991 | Schulz | 524/71 |
| 5,534,568 | 7/1996 | Schulz et al. | 524/59 |
| 5,837,756 | 11/1998 | Steininger-Clites et al. | 524/68 |

*Primary Examiner*—Peter A. Szekely
*Attorney, Agent, or Firm*—Alvin T. Rockhill

[57] ABSTRACT

It has been determined that a specific type of emulsion SBR can be used to modify asphalt cement to greatly enhance the resistance to shoving, rutting and low temperature cracking of asphalt concretes made therewith. It has further been determined that this emulsion SBR is compatible with virtually all types of asphalt and that modified asphalt cements made therewith have extremely high levels of force ductility, tenacity and toughness. The SBR used to modify asphalt cement in the practice of this invention is a blend of (i) a high molecular weight styrene-butadiene rubber having a weight average molecular weight of at least about 300,000 and (ii) a low molecular weight styrene-butadiene rubber having a weight average molecular weight of less than about 280,000; wherein the ratio of the high molecular weight styrene-butadiene rubber to the low molecular weight styrene-butadiene rubber is within the range of about 80:20 to about 25:75; and wherein the bound styrene content of the high molecular weight styrene-butadiene rubber differs from the bound styrene content of the low molecular weight styrene-butadiene rubber by at least 5 percentage points. These SBR compositions are comprised of repeat units which are derived from styrene and 1,3-butadiene, wherein the styrene-butadiene rubber composition has a number average molecular weight as determined by field flow fractionation which is within the range of about 50,000 to 150,000 and wherein the styrene-butadiene rubber has a light scattering to refractive index ratio which is within the range of 1.8 to 3.9.

32 Claims, No Drawings

SBR FOR ASPHALT CEMENT MODIFICATION

This application claims benefit of U.S. Provisional Application Ser. No. 60/153,846 filed Sep. 14, 1999.

BACKGROUND OF THE INVENTION

The importance of roads and highways has been appreciated since the time of the Roman Empire. By about 300 B.C., the first section of the Appian Way extending from Rome to Capua was built. Some of the more than 50,000 miles of roadway ultimately built in the Roman Empire was constructed with heavy stone. However, not much progress was made in the art of road construction from the era of the Roman Empire until the development of the motor vehicles, such as automobiles and trucks.

For centuries, stone blocks, wood blocks, vitrified brick and natural asphalt (bitumen) have been used to pave roads and highways. However, at the beginning of the automobile era, most rural roadway surfacing consisted of broken stone or gravel. Such roads were often rough, dusty and clearly inadequate for modern automobile and truck traffic.

Today, the United States has the most extensive highway system in the world with about 2,000,000 miles of paved road. Napoleon realized the importance of roadway systems and built such a system in France which today has the second most extensive system of paved roadways in the world covering about 500,000 miles. Germany, Japan, Great Britain, India, and Australia also currently have systems of paved roads which extend well over 100,000 miles. In addition to these public roadways, there are countless paved driveways and parking lots all over the world.

Today, roads, highways, driveways and parking lots are often paved with asphalt concrete. Pavement can be made with asphalt concretes which are dust-free, smooth and which offer the strength required for modern automobile and heavy truck traffic. Asphalt concrete is generally made by mixing aggregate (sand and gravel or crushed stone) with the proper quantity of an asphalt cement at an elevated temperature. The hot asphalt concrete is then placed by a layering machine or paver on the surface being paved and thoroughly rolled before the asphalt concrete mixture cools. The asphalt concrete is normally applied at a thickness varying from about 25 to about 100 millimeters.

Asphalt concrete pavements can be made to be very smooth which offers outstanding frictional resistance for vehicles operating thereon. Such asphalt concrete pavement can also be repaired simply by adding additional hot asphalt concrete to holes and other types of defects which develop in the surface. Asphalt concrete pavements can also be upgraded easily by adding additional layers of hot asphalt concrete to old surfaces which are in need of repair.

Even though asphalt concrete offers numerous benefits as a paving material, its use is not trouble-free. One major problem encountered with asphalt concrete pavements is the loss of the adhesive bond between the aggregate surface and the asphalt cement. This breaking of the adhesive bond between the asphalt cement and the aggregate surface is known as "stripping." The stripping of asphalt binder from aggregate surfaces results in shorter pavement life and many millions of dollars of maintenance work on American highways each year. Reduction of this stripping tendency is of great interest when trying to improve conditions of roads and lowering these maintenance costs.

Over the years, various methods have been developed to reduce stripping tendencies. For instance, amines and lime are known to act as anti-stripping agents and are frequently applied to the surface of the aggregate prior to mixing it with the asphalt cement in making asphalt concrete. U.S. Pat. No. 5,219,901 discloses a technique for reducing stripping tendencies which involves coating the aggregate with a thin continuous film of a water-insoluble high molecular weight organic polymer, such as an acrylic polymer or a styrene-acrylic polymer.

U.S. Pat. No. 5,262,240 discloses a technique for providing aggregate with a high level of resistance to stripping by water, which comprises: (1) mixing the aggregate with latex to form a latex/aggregate mixture which is comprised of from about 0.005 weight percent to about 0.5 weight percent dry polymer; (2) heating the latex/aggregate mixture to a temperature which is within the range of about 66° C. to about 232° C.; (3) maintaining the latex/aggregate mixture at said elevated temperature for a time which is sufficient to reduce the moisture content of the latex/aggregate mixture below about 0.7 weight percent and to allow the polymer in the latex to crosslink on the surface of the aggregate to produce the coated aggregate.

At high service temperatures, such as those experienced on hot summer days, asphalt concrete can experience rutting and shoving. On the other hand, at low service temperatures, such as those experienced during cold winter nights, asphalt concrete can also experience low temperature cracking. To combat these problems, it is known in the art to modify asphalt cements with rubbery polymers, such as styrene-butadiene rubber latex. Such modification techniques can greatly improve resistance to rutting, shoving and low temperature cracking. However, the rubbery polymers used in such applications have a tendency to phase-separate from hot asphalt cements due to poor compatibility. A solution to the problem of poor compatibility is offered by the technique disclosed in U.S. Pat. No. 5,002,987.

U.S. Pat. No. 5,002,987 relates to a modified asphalt cement containing from about 90 to about 99 parts by dry weight of an asphalt cement and from about 1 to about 10 parts by dry weight of a rubber latex having a weight average molecular weight of less than 250,000 and a Mooney viscosity of less than 50. The latex is a random polymer comprising from about 60 to 100 weight percent of at least one conjugated diolefin containing from 4 to 6 carbon atoms and from about 0 to 40 weight percent styrene. This latex polymer is highly compatible with the asphalt and provides good ductility which results in good resistance to low temperature cracking. However, the utilization of the rubbery polymers described in U.S. Pat. No. 5,002,987 in asphalt cements provide little improvement in elastic recovery or toughness. Thus, their use results in compromised rutting and shoving characteristics. There accordingly is a current need for a modifier which is compatible with asphalt cement and which improves the resistance of asphalt concrete made therewith to rutting, shoving and low temperature cracking.

U.S. Pat. No. 5,534,568 reveals an asphalt concrete which is comprised of (A) from about 90 weight percent to about 99 weight percent of an aggregate and (B) from about 1 weight percent to about 10 weight percent of a modified asphalt cement which is comprised of (1) from about 90 weight percent to about 99 weight percent of asphalt and (2) from about 1 weight percent to about 10 weight percent of a rubbery polymer which is comprised of repeat units which are derived from (a) about 64 weight percent to about 84.9 weight percent of a conjugated diolefin monomer, (b) about 15 weight percent to about 33 weight percent of a vinyl aromatic monomer and (c) about 0.1 weight percent to about 3 weight percent of isobutoxymethyl acrylamide.

U.S. Pat. No. 4,145,322 discloses a process for making a bitumen-polymer composition which consists of contacting with each other, at a temperature between 130° C. and 230° C., 80 to 98 weight percent of a bitumen exhibiting a penetration value between 30 and 220 and 2 to 20 weight percent of a block copolymer, with an average molecular weight between 30,000 and 330,000 having the theoretical formula $S_x$-$B_y$ in which S corresponds to the styrene structure groups, B corresponds to the conjugated diene structure groups and x and y are integers, stirring the obtained mixture for at least two hours, then adding 0.1 to 3 percent by weight of elemental sulfur with respect to the bitumen and maintaining the mixture thus obtained under agitation for at least 20 minutes.

Batch polymerization techniques are normally used in synthesizing block copolymers which are utilized in modifying asphalt in order to attain desired performance characteristics. However, it would be highly desirable from a cost standpoint to be capable of synthesizing such polymers by utilizing continuous polymerization techniques. It would also be highly desirable to increase the force ductility, elastic recovery, toughness and tenacity of asphalt which is modified with such polymers.

U.S. Pat. No. 5,837,756 discloses an asphalt concrete which is comprised of (A) from about 90 weight percent to about 99 weight percent of an aggregate and (B) from about 1 weight percent to about 10 weight percent of a modified asphalt cement which is comprised of (i) from about 90 weight percent to about 99 weight percent asphalt; (ii) from about 1 weight percent to about 10 weight percent of a styrene-butadiene polymer made by a process which is comprised of the steps of: (1) continuously charging 1,3-butadiene monomer, an organo lithium compound, a polar modifier and an organic solvent into a first polymerization zone, (2) allowing the 1,3-butadiene monomer to polymerize in said first polymerization zone to a conversion of at least about 90 percent to produce a living polymer solution which is comprised of said organic solvent and living polybutadiene chains having a number average molecular weight which is within the range of about 20,000 to about 60,000, (3) continuously withdrawing said living polymer solution from said first reaction zone, (4) continuously charging styrene monomer, divinyl benzene and the living polymer solution being withdrawn from the first polymerization zone into a second polymerization zone, (5) allowing the styrene monomer and divinyl benzene monomer to polymerize in said second polymerization zone to produce a solution of styrene-butadiene polymer having a number average molecular weight which is within the range of about 30,000 to about 85,000 and (6) continuously withdrawing the solution of said styrene-butadiene polymer from the second polymerization zone; and (iii) from about 0.1 weight percent to about 5 parts by weight of sulfur per 100 parts by weight of the styrene-butadiene polymer.

SUMMARY OF THE INVENTION

It has been determined that a specific type of emulsion styrene-butadiene rubber can be used to modify asphalt cement to greatly enhance the resistance to shoving, rutting and low temperature cracking of asphalt concretes made therewith. It has further been determined that this styrene-butadiene rubber (SBR) is compatible with virtually all types of asphalt and that modified asphalt cements made therewith have extremely high levels of force ductility, tenacity and toughness.

The SBR used to modify asphalt cement in the practice of this invention is a blend of (i) a high molecular weight styrene-butadiene rubber having a weight average molecular weight of at least about 300,000 and (ii) a low molecular weight styrene-butadiene rubber having a weight average molecular weight of less than about 280,000; wherein the ratio of the high molecular weight styrene-butadiene rubber to the low molecular weight styrene-butadiene rubber is within the range of about 80:20 to about 25:75; and wherein the bound styrene content of the high molecular weight styrene-butadiene rubber differs from the bound styrene content of the low molecular weight styrene-butadiene rubber by at least 5 percentage points. These SBR compositions are comprised of repeat units which are derived from styrene and 1,3-butadiene, wherein the styrene-butadiene rubber composition has a number average molecular weight as determined by field flow fractionation which is within the range of about 50,000 to 150,000 and wherein the styrene-butadiene rubber has a light scattering to refractive index ratio which is within the range of 1.8 to 3.9.

The present invention discloses an asphalt concrete which is comprised of (A) from about 90 weight percent to about 99 weight percent of an aggregate and (B) from about 1 weight percent to about 10 weight percent of a modified asphalt cement which is comprised of (1) from about 90 weight percent to about 99 weight percent of asphalt; and (2) from about 1 weight percent to about 10 weight percent of a rubbery polymer which is comprised of repeat units which are derived from styrene and 1,3-butadiene, wherein the styrene-butadiene rubber composition has a number average molecular weight as determined by field flow fractionation which is within the range of about 50,000 to 150,000 and wherein the styrene-butadiene rubber has a light scattering to refractive index ratio which is within the range of 1.8 to 3.9.

The subject invention also reveals an asphalt concrete which is comprised of (A) from about 90 weight percent to about 99 weight percent of an aggregate and (B) from about 1 weight percent to about 10 weight percent of a modified asphalt cement which is comprised of (1) from about 90 weight percent to about 99 weight percent of asphalt; and (2) from about 1 weight percent to about 10 weight percent of a rubbery polymer which is comprised of repeat units which are derived from styrene and 1,3-butadiene, wherein a plot of log frequency versus elastic modulus of the styrene-butadiene rubber composition crosses over a plot of log frequency versus loss modulus of the styrene-butadiene rubber composition at a frequency within the range of 0.001 radians per second to 100 radians per second when conducted at 90° C. to 120° C. using parallel plate geometry in the dynamic oscillation frequency sweep of the styrene-butadiene rubber.

The subject invention further discloses an asphalt concrete which is comprised of (A) from about 90 weight percent to about 99 weight percent of an aggregate and (B) from about 1 weight percent to about 10 weight percent of a modified asphalt cement which is comprised of (1) from about 90 weight percent to about 99 weight percent of asphalt; and (2) from about 1 weight percent to about 10 weight percent of a rubbery polymer which is comprised of a blend of (i) a high molecular weight styrene-butadiene rubber having a weight average molecular weight of at least about 300,000 and (ii) a low molecular weight styrene-butadiene rubber having a weight average molecular weight of less than about 280,000; wherein the ratio of the high molecular weight styrene-butadiene rubber to the low molecular weight styrene-butadiene rubber is within the range of about 80:20 to about 25:75; and wherein the bound styrene content of the high molecular weight styrene-butadiene rubber differs from the bound styrene content of the low molecular weight styrene-butadiene rubber by at least 5 percentage points.

The present invention also discloses a modified asphalt cement which is comprised of (1) from about 90 weight percent to about 99 weight percent of asphalt; and (2) from about 1 weight percent to about 10 weight percent of a rubbery polymer which is comprised of repeat units which are derived from styrene and 1,3-butadiene, wherein the styrene-butadiene rubber composition has a number average molecular weight as determined by field flow fractionation which is within the range of about 50,000 to 150,000 and wherein the styrene-butadiene rubber has a light scattering to refractive index ratio which is within the range of 1.8 to 3.9.

The subject invention further reveals a modified asphalt cement which is comprised of (1) from about 90 weight percent to about 99 weight percent of asphalt; and (2) from about 1 weight percent to about 10 weight percent of a rubbery polymer which is comprised of repeat units which are derived from styrene and 1,3-butadiene, wherein a plot of log frequency versus elastic modulus of the styrene-butadiene rubber composition crosses over a plot of log frequency versus loss modulus of the styrene-butadiene rubber composition at a frequency within the range of 0.001 radians per second to 100 radians per second when conducted at 90° C. to 120° C. using parallel plate geometry in the dynamic oscillation frequency sweep of the styrene-butadiene rubber.

The present invention also reveals a modified asphalt cement which is comprised of (1) from about 90 weight percent to about 99 weight percent of asphalt; and (2) from about 1 weight percent to about 10 weight percent of a blend of (i) a high molecular weight styrene-butadiene rubber having a weight average molecular weight of at least about 300,000 and (ii) a low molecular weight styrene-butadiene rubber having a weight average molecular weight of less than about 280,000; wherein the ratio of the high molecular weight styrene-butadiene rubber to the low molecular weight styrene-butadiene rubber is within the range of about 80:20 to about 25:75; and wherein the bound styrene content of the high molecular weight styrene-butadiene rubber differs from the bound styrene content of the low molecular weight styrene-butadiene rubber by at least 5 percentage points.

DETAILED DESCRIPTION OF THE INVENTION

The styrene-butadiene rubber composition which is used to modify asphalt cement in accordance with this invention is made by emulsion polymerization using a free radical emulsion polymerization technique. The styrene-butadiene rubber composition is made by synthesizing a high molecular weight SBR latex and a low molecular weight SBR latex and then blending the two latices. The styrene-butadiene rubber of this invention is preferably made by synthesizing a high molecular weight SBR latex and a low molecular weight SBR latex utilizing the general free radical emulsion polymerization technique described in U.S. Pat. No. 5,583,173. This polymerization technique is known as the FIM process (feed-injection-monomer). The latex of the high molecular weight SBR and the latex of the low molecular weight SBR are then blended.

The FIM process is carried out by adding styrene monomer, 1,3-butadiene monomer, water, a free radical generator and a soap system to a first polymerization zone to form an aqueous polymerization medium. The first polymerization zone will normally be a reactor or series of two or more reactors. Copolymerization of the monomers is initiated with the free radical generator. This copolymerization reaction results in the formation of a low conversion polymerization medium.

At the point where the low conversion polymerization medium reaches a monomer conversion which is within the range of about 15 percent to about 40 percent, the low conversion polymerization medium is charged into a second polymerization zone. The second polymerization zone can be a reactor or a series of two or more reactors. In any case, the second polymerization zone is subsequent to the first polymerization zone. The low conversion polymerization medium will normally be charged into the second polymerization zone at a monomer conversion level which is within the range of about 17 percent to about 35 percent. It will more preferably be charged into the second polymerization zone at a level of monomer conversion which is within the range of 20 percent to 30 percent.

Additional styrene monomer and butadiene monomer are charged into the second polymerization zone. Normally, from about 20 percent to about 50 percent of the total amount of styrene monomer and 1,3-butadiene monomer will be charged into the second polymerization zone (from 50 percent to 80 percent of the total monomers are charged into the first polymerization zone). It is normally preferred to charge from about 30 weight percent to about 45 weight percent of the total quantity of monomers charged into the second polymerization zone (from 55 percent to 70 percent of the total monomers charged will be charged into the first polymerization zone). It is generally most preferred to charge from about 35 weight percent to about 42 weight percent of the total quantity of monomers charged into the second polymerization zone (from 58 percent to 65 percent of the total monomers charged will be charged into the first polymerization zone). By splitting the monomer charge between the first polymerization zone and the second polymerization zone, the total quantity of soap required to provide a stable latex is reduced by at least about 30 percent.

The copolymerization in the second polymerization zone is allowed to continue until a monomer conversion of at least 50 percent is attained. The copolymerization will preferably be allowed to continue until a total monomer conversion which is within the range of 50 percent to 68 percent is realized. More preferably, the copolymerization in the second reaction zone will be allowed to continue until a monomer conversion of 58 percent to 65 percent is reached.

In synthesizing the SBR latex, generally from about 1 weight percent to about 50 weight percent styrene and from about 50 weight percent to about 99 weight percent 1,3-butadiene are copolymerized. However, it is contemplated that various other vinyl aromatic monomers can be substituted for the styrene in the SBR. For instance, some representative examples of vinyl aromatic monomers that can be substituted for styrene and copolymerized with 1,3-butadiene in accordance with this invention include 1-vinylnaphthalene, 3-methylstyrene, 3,5-diethylstyrene, 4-propylstyrene, 2,4,6-trimethylstyrene, 4-dodecylstyrene, 3-methyl-5-normal-hexylstyrene, 4-phenylstyrene, 2-ethyl-4-benzylstyrene, 3,5-diphenylstyrene, 2,3,4,5-tetraethylstyrene, 3-ethyl-1-vinylnaphthalene, 6-isopropyl-1-vinylnaphthalene, 6-cyclohexyl-1-vinylnaphthalene, 7-dodecyl-2-vinylnaphthalene, á-methylstyrene, and the like. The high molecular weight SBR will typically contain from about 5 weight percent to about 50 weight percent bound styrene and from about 50 weight percent to about 95 weight percent bound butadiene. It is typically preferred for the high molecular weight SBR to contain from about 20 weight percent to about 30 weight percent styrene and from about 70 weight percent to about 80 weight percent 1,3-butadiene. It is normally most preferred for high molecular weight SBR to contain from about 22 weight percent to about 28 weight percent styrene and from about 72 weight percent to about 78 weight percent 1,3-butadiene. Like ratios of styrene, monomer and butadiene monomer will accordingly be charged into the first polymerization zone and the second polymerization zone.

The low molecular weight SBR will normally contain from about 1 weight percent to about 50 weight percent styrene and from about 50 weight percent to about 99 weight percent 1,3-butadiene. In some cases, for instance, where low rolling resistance and excellent treadwear characteristics are desired, it will be desirable for the low molecular weight SBR to contain a relatively small amount of styrene which is within the range of about 3 weight percent to about 10 weight percent with the amount of 1,3-butadiene in the SBR being within the range of about 90 weight percent to about 97 weight percent. Even lower amounts of bound styrene can be included in the low molecular weight polymer. For instance, the low molecular weight rubbery polymer can contain from 0 weight percent to 3 weight percent bound styrene and from 97 weight percent to 100 weight percent bound butadiene. Thus, in the most extreme case, polybutadiene can be used as one of the polymeric components of the blend. In other cases, for instance, in situations where high traction characteristics are desired, a much higher level of styrene will be incorporated into the low molecular weight SBR. In such cases, it is preferred for low molecular weight SBR to contain from about 40 weight percent to about 50 weight percent styrene and from about 50 weight percent to about 60 weight percent 1,3-butadiene. Like ratios of styrene monomer and butadiene monomer will accordingly be charged into the first polymerization zone and the second polymerization zone.

It is critical for the high molecular weight SBR to have a bound styrene content which differs from the bound styrene content of the low molecular weight SBR by at least 5 percentage points. The high molecular weight SBR will normally have a bound styrene content which differs from the bound styrene content of the low molecular weight SBR by 5 to 40 percentage points. The high molecular weight SBR will typically have a bound styrene content which differs from the bound styrene content of the low molecular weight SBR by at least 10 percentage points. In most cases, the high molecular weight SBR will have a bound styrene content which differs from the bound styrene content of the low molecular weight SBR by 10 to 30 percentage points with a difference of 15 to 25 percentage points being most typical. It is normally preferred for the high molecular weight SBR to have a bound styrene content which differs from the bound styrene content of the low molecular weight SBR by at least 15 percentage points with a difference of at least 20 percentage points being most preferred.

It should be understood that either the high molecular weight or the low molecular weight SBR can have the higher bound styrene content. In other words, the SBR in the blend having the higher bound styrene content can be either the low or the high molecular weight polymer in the blend. It should also be understood that polybutadiene (which contains 0 percent bound styrene) can be used as one of the polymers in the blend. In such cases, the polybutadiene can be either the high or the low molecular weight polymer. In cases where polybutadiene is used as one of the rubbery polymers in the blend, the SBR in the blend will typically have a bound styrene content of at least about 10 weight percent. In such cases, the SBR in the blend will more typically have a bound styrene content of at least about 15 weight percent and will most preferably have a bound styrene content of at least about 20 weight percent.

Essentially any type of free radical generator can be used to initiate such free radical emulsion polymerizations. For example, free radical generating chemical compounds, ultraviolet light or radiation can be used. In order to ensure a satisfactory polymerization rate, uniformity and a controllable polymerization, free radical generating chemical agents which are water- or oil-soluble under the polymerization conditions are generally used with good results.

Some representative examples of free radical initiators which are commonly used include the various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauryl peroxide, cumene hydroperoxide, p-menthane hydroperoxide, t-butyl hydroperoxide, acetyl acetone peroxide, dicetyl peroxydicarbonate, t-butyl peroxyacetate, t-butyl peroxymaleic acid, t-butyl peroxybenzoate, acetyl cyclohexyl sulfonyl peroxide, and the like; the various azo compounds such as 2-t-butylazo-2-cyanopropane, dimethyl azodiisobutyrate, azodiisobutyronitrile, 2-t-butylazo-1-cyanocyclohexane, 1-t-amylazo-1-cyanocyclohexane, and the like, the various alkyl perketals, such as 2,2-bis-(t-butylperoxy)butane, ethyl 3,3-bis(t-butylperoxy)butyrate, 1,1-di-(t-butylperoxy) cyclohexane, and the like. Persulfate initiators, such as potassium persulfate and ammonium persulfate, are especially useful in such aqueous emulsion polymerizations.

The amount of initiator employed will vary with the desired molecular weight of the SBR being synthesized. Higher molecular weights are achieved by utilizing smaller quantities of the initiator and lower molecular weights are attained by employing larger quantities of the initiator. However, as a general rule, from 0.005 to 1 phm (parts by weight per 100 parts by weight of monomer) of the initiator will be included in the reaction mixture. In the case of metal persulfate initiators, typically from 0.1 phm to 0.5 phm of the initiator will be employed in the polymerization medium. The molecular weight of the SBR produced is, of course, also dependent upon the amount of chain transfer agent, such as t-dodecyl mercaptan, present during the polymerization. For instance, low molecular weight SBR can be synthesized by simply increasing the level of chain transfer agent. As a specific example, in the synthesis of high molecular weight SBR, the amount of t-dodecyl mercaptan used can be within the range of about 0.125 phm to about 0.150 phm. Low molecular weight SBR can be produced by simply increasing the level of t-dodecyl mercaptan present during the polymerization. For instance, the presence of 0.38 phm to 0.40 phm of t-dodecyl mercaptan will typically result in the synthesis of a low molecular weight SBR.

Unless indicated otherwise, molecular weights are determined by gel permeation chromatography (GPC). A traditional GPC system is used with both light scattering (Wyatt Technologies Inc, model Mini DAWN) and refractive index for detection. Samples are filtered through a 1.0 micron syringe filter. In some cases, number average molecular weights are determined by thermal field flow fractionation. Number average molecular weight that is determined by thermal field flow fractionation is sometimes abbreviated as $M_{n3F}$. In determining $M_{n3F}$, a thermal field flow fractionation system that consists of an FFFractionation, LLC (Salt Lake City, Utah) model T-100 Polymer Fractionator with a model T-005 channel spacer, a Hewlett Packard (Palo Alto, Calif.) model 1047A refractive index detector and a Wyatt Technologies Corporation (Santa Barbara, Calif.) model DAWN DSP laser photometer detector is used. In the test procedure, degassed tetrahydrofuran is used as the carrier solvent which is pumped through the system at a flow rate of 0.6 mL/minute. The cold wall temperature in the thermal field flow fractionation is controlled by an FTS Systems model RC150 recirculating chiller.

Polymer fractionation is accomplished using a Power Programmed Method in FFFractionation, LLC software (TEMP, version 1.30 beta 7). The program conditions are as follows: Initial Delta T is 60° C., equilibration time is 0.5 minutes, t1 is 5.0 minutes, ta is −6.0, hold time is 30 minutes and final Delta T is 0° C. The temperature set point for the cold wall chiller is 25° C. However, at the initial delta T of 60° C., the cold wall temperature is typically around 40° C. Polymer samples are dissolved in a solvent and then injected unfiltered into the thermal field flow fractionation system. The sample mass injected is typically about 0.12 mg.

The raw data is collected and processed in Wyatt Technologies Corporation software (ASTRA, version 4.70.07). The data collection period is 25 minutes. Baselines for the peaks are typically set from 1.5 minutes to 25 minutes for the light scattering detectors and from 1.5 minutes to 20 minutes for the refractive index detector. For the data processing, the DAWN light scattering detectors used include 5 through 16 (representing angles from 39° to 139° in THF). The angular dependence of the light scattering is fit using a first order equation in the Zimm formalism. A refractive index increment (dn/dc) of 0.154 is used for all emulsion polymer samples and 0.140 is used for solution polymer samples. The sensitivity of the refractive index detector (Aux 1 Constant) is determined according to Wyatt Technologies procedures using a monodisperse 30,000 molecular weight polystyrene standard.

Average molecular weights and root mean square radii for the samples are calculated using slice data fit to a first order polynomial. The light scattering to refractive index ratio (LS/RI) is calculated using the baseline corrected, normalized voltages from the DAWN 90° detector (d11) and the Hewlett Packard model 1047A refractive index detector. The area under each peak was estimated as the sum of the voltages within the defined integration limits.

The high molecular weight SBR will typically have a number average molecular weight (by GPC) which is within the range of about 200,000 to about 1,000,000, a weight average molecular weight (by GPC) which is within the range of about 300,000 to about 2,000,000 and a Mooney ML 1+4 viscosity which is within the range of about 80 to about 160. The high molecular weight SBR will preferably have a number average molecular weight which is within the range of about 300,000 to about 970,000, a weight average molecular weight which is within the range of about 400,000 to about 1,750,000 and a Mooney ML 1+4 viscosity which is within the range of about 90 to about 150. The high molecular weight SBR will more preferably have a number average molecular weight which is within the range of about 650,000 to about 930,000, a weight average molecular weight which is within the range of about 1,000,000 to about 1,500,000 and a Mooney ML 1+4 viscosity which is within the range of about 95 to about 130.

The low molecular weight SBR will typically have a number average molecular weight (by GPC) which is within the range of about 20,000 to about 150,000, a weight average molecular weight (by GPC) which is within the range of about 40,000 to about 280,000 and a Mooney ML 1+4 viscosity which is within the range of about 2 to about 40. The low molecular weight SBR will preferably have a number average molecular weight which is within the range of about 50,000 to about 120,000, a weight average molecular weight which is within the range of about 70,000 to about 270,000 and a Mooney ML 1+4 viscosity which is within the range of about 3 to about 30. The low molecular weight SBR will more preferably have a number average molecular weight which is within the range of about 70,000 to about 110,000, a weight average molecular weight which is within the range of about 120,000 to about 260,000 and a Mooney ML 1+4 viscosity which is within the range of about 5 to about 20. The low molecular weight SBR will usually have a Mooney ML 1+4 viscosity which is within the range of 12–18.

The low molecular weight SBR will have a Mooney ML 1+4 viscosity that differs from the Mooney ML 1+4 viscosity of the high molecular weight SBR by at least 50 Mooney points. The high molecular weight SBR will normally have a Mooney ML 1+4 viscosity that is at least 70 Mooney points higher than the Mooney ML 1+4 viscosity of the low molecular weight SBR. The high molecular weight SBR will preferably have a Mooney ML 1+4 viscosity that is at least 80 Mooney points higher than the Mooney ML 1+4 viscosity of the low molecular weight SBR.

The soap systems used in the emulsion polymerization process contain a combination of rosin acid and fatty acid emulsifiers. The weight ratio of fatty acid soaps to rosin acid soaps will be within the range of about 50:50 to 90:10. It is normally preferred for the weight ratio of fatty acid soaps to rosin acid soaps to be within the range of 60:40 to 85:15. It is normally more preferred for the weight ratio of fatty acid soaps to rosin acid soaps to be within the range of 75:25 to 82:18. All of the soap is charged into the first polymerization zone. The total amount of soap employed will be less than 3.5 phm. The quantity of soap employed will normally be within the range of about 2.5 phm to 3.2 phm. It is typically preferred to utilize a level of soap which is within the range of about 2.6 phm to about 3.0 phm. In most cases, it will be most preferred to use an amount of the soap system which is within the range of about 2.7 phm to 2.9 phm. The precise amount of the soap system required in order to attain optimal results will, of course, vary with the specific soap system being used. However, persons skilled in the art will be able to easily ascertain the specific amount of soap system required in order to attain optimal results.

The free radical emulsion polymerization will typically be conducted at a temperature which is within the range of about 35° F. (2° C.) to about 65° F. (18° C.). It is generally preferred for the polymerization to be carried out at a temperature which is within the range of 40° F. (4° C.) to about 60° F. (16° C.). It is typically more preferred to utilize a polymerization temperature which is within the range of about 45° F. (7° C.) to about 55° F. (13° C.). To increase conversion levels, it can be advantageous to increase the temperature as the polymerization proceeds.

After the desired monomer conversion is reached in the second polymerization zone, the SBR latex made is removed from the second polymerization zone and a short stop is added to terminate the copolymerization. This is a convenient point to blend the emulsion of the high molecular weight SBR with the emulsion of the low molecular weight SBR. The weight ratio of the high molecular weight SBR to the low molecular weight SBR in the blend will typically be within the range of about 80:20 to about 25:75. In most cases, the weight ratio of the high molecular weight SBR to the low molecular weight SBR in the blend will be within the range of about 70:30 to about 30:70. It is typically preferred for the weight ratio of the high molecular weight SBR to the low molecular weight SBR in the blend to be within the range of about 60:40 to about 40:60.

The styrene-butadiene rubber composition of this invention made by blending the two latices will have an $M_{n3F}$ which is within the range of 50,000 to 150,000. The styrene-butadiene rubber composition will typically have an $M_{n3F}$ which is within the range of 60,000 to 145,000 and will more typically have an $M_{n3F}$ which is within the range of 75,000 to 140,000. The styrene-butadiene rubber composition will preferably have an $M_{n3F}$ which is within the range of 90,000 to 135,000. The styrene-butadiene rubber composition will also have a light scattering to refractive index ratio (LS/RI) which is within the range of 1.8 to 3.9. The styrene-butadiene rubber composition will typically have a light scattering to refractive index ratio which is within the range of 2.0 to 3.8 and will more typically have a light scattering to refractive index ratio of 2.1 to 3.7. It is preferred for the styrene-butadiene rubber composition to have a light scattering to refractive index ratio which is within the range of 2.2 to 3.0.

In the styrene-butadiene rubber compositions of this invention, if the dynamic oscillation frequency sweep of frequency versus elastic modulus (G') and frequency versus loss modulus (G") are plotted, there is a crossover at a frequency within the range of 0.001 radians per second to 100 radians per second when conducted at 90° C. to 120° C. using a parallel plate geometry. In other words, at low frequencies, at 120° C., such as 0.1 radians per second, G' is lower than G". However, G' increasing with increasing frequency until it equals G" and is ultimately greater than G" at a high frequency, such as 10 radians per second. The crossover point will typically be within the frequency range of 0.001 radians per second to 10 radians per second and will more typically be within the frequency range of 0.01 radians per second to 5 radians per second. In most cases, the crossover point will be within the frequency range of 0.05 radians per second to 1 radians per second at 120°. In the test procedure used, the rubber sample is preformed into a sample 20 mm in diameter having a thickness of 2 mm. The sample is then placed in a control stress or control strain rheometer between parallel plates at a given gap distance. The sample is then run through a frequency sweep (such as 0.01 Hz to 100 Hz) at some applied stress (such as 20,000 Pa). This procedure is performed at different temperatures between 90° C. and 120° C. at some defined temperature interval. G' is the storage modulus and represents the elastic portion of the polymer and is very sensitive to changes in gel and molecular weight. G" is the loss modulus and is representative of the viscous portion of the sample.

Asphalt cement can be modified with the SBR latex composition by simply mixing the latex into hot asphalt. The latex of the SBR composition may be added to the asphalt in an amount of from about 1 to about 10 parts by dry weight of the latex. Preferably, from about 1 to about 6 parts by dry weight is used with a range of from about 2 to about 4 parts being particularly preferred.

The SBR latex is slowly added to heated asphalt with agitation. The asphalt is generally heated to a temperature ranging from about 150° C. to about 170° C. At the elevated temperatures used, the water in the latex quickly evaporates leaving only the rubbery polymer which was in the latex. After the rubber latex has been thoroughly mixed with the asphalt cement, one should store the modified asphalt cement at elevated temperatures to avoid solidification prior to use.

Asphalt is defined by ASTM as a dark brown to black cementitious material in which the predominant constituents are bitumens that occur in nature or are obtained in petroleum processing. Asphalts characteristically contain very high molecular weight hydrocarbons called asphaltenes. These are essentially soluble in carbon disulfide, and aromatic and chlorinated hydrocarbons. Bitumen is a generic term defined by ASTM as a class of black or dark colored (solid, semi-solid or viscous) cementitious substances, natural or manufactured, composed principally of high molecular weight hydrocarbons, of which asphalts, tars, pitches and asphaltites are typical. ASTM further classifies asphalts or bituminous materials as solids, semi-solids or liquids using a penetration test for consistency or viscosity. In this classification, solid materials are those having a penetration at 25° C. under a load of 100 grams applied for 5 seconds, of not more than 10 decimillimeters (1 millimeter). Semi-solids are those having a penetration at 25° C. under a load of 100 grams applied for 5 seconds of more than 10 decimillimeters (1 millimeter) and a penetration at 25° C. under a load of 50 grams applied for 1 second of not more than 35 millimeters. Semi-solid and liquid asphalts predominate in commercial practice today.

Asphalts are usually specified in several grades for the same industry, differing in hardness and viscosity. Specifications of paving asphalt cements generally include five grades differing in either viscosity level at 60° C. or penetration level. Susceptibility of viscosity to temperatures is usually controlled in asphalt cement by its viscosity limits at a higher temperature such as 135° C. and a penetration or viscosity limit at a lower temperature such as 25° C. For asphalt cements, the newer viscosity grade designation is the mid-point of the viscosity range.

The asphalt materials which may be used in the present invention are those typically used for road paving, repair and maintenance purposes. Petroleum asphalts are the most common source of asphalt cements. Petroleum asphalts are produced from the refining of petroleum and used predominantly in paving and roofing applications. Petroleum asphalts, compared to native asphalts, are organic with only trace amounts of inorganic materials. Some representative examples of asphalt cements that may be used in the present invention have an ASTM grade of AC-2.5, AC-5, AC-10, AC-20 and AC-40. The preferred asphalt cements include AC-5, AC-10 and AC-20.

In addition to the rubbery polymer and the asphalt cement, the modified asphalt cement of the present invention may contain other conventional additives. Examples of conventional additives include antistripping compounds, fibers, release agents and fillers. Some specific examples of additives which can be employed include sulfur, kaolin clay, calcium carbonate, bentonite clay, sanders dust and cellulose fibers.

After the asphalt cement has been modified, it can be mixed with aggregate to make asphalt concrete using standard equipment and procedures utilized in making asphalt concrete. As a general rule, from about 1 weight percent to about 10 weight percent of the modified asphalt cement and from about 90 weight percent to about 99 weight percent aggregate will be included in the asphalt concrete. It is more typical for the asphalt concrete to contain from about 3 weight percent to about 8 weight percent of the modified asphalt cement and from about 92 weight percent to about 97 weight percent of the aggregate. It is normally preferred for the asphalt concrete to contain from about 4 weight percent to about 7 weight percent of the modified asphalt cement and from about 93 weight percent to about 96 weight percent of the aggregate.

The aggregate is mixed with the asphalt to attain an essentially homogeneous asphalt concrete. The coated aggregate is mixed with the asphalt cement utilizing conventional techniques and standard equipment. For instance, the aggregate can be dried and mixed with asphalt to produce asphalt concrete on a continuous basis in a standard mixer.

Standard aggregate can be utilized in the practice of this invention. The aggregate is essentially a mixture containing rocks, stones, crushed stone, gravel and/or sand. The aggregate will typically have a wide distribution of particle sizes ranging from dust to golf ball size. The best particle size distribution varies from application to application. In many cases, it will be advantageous to coat the aggregate with latex in accordance with the teachings of U.S. Pat. No. 5,262,240 to improve resistance to stripping by water.

The asphalt concrete made using the modified asphalt cement of this invention can then be used to pave roads, highways, exit ramps, streets, driveways, parking lots, airport runways or airport taxiways utilizing conventional procedures. However, pavements made utilizing the asphalt concretes of this invention offer resistance to rutting, shoving and low temperature cracking. Additionally, they can be applied without encountering processing difficulties due to the latex used for the modification being incompatible with the asphalt.

This invention is illustrated by the following examples which are merely for the purpose of illustration and are not to be regarded as limiting the scope of the invention or the manner in which it can be practiced. Unless specifically indicated otherwise, all parts and percentages are given by weight.

EXAMPLE 1

In this experiment, an SBR latex was synthesized by copolymerizing 1,3-butadiene monomer and styrene monomer by the FIM process. This procedure was conducted in a pilot plant which consisted of a series of five polymerization reactors. All of the reactors used in this procedure were 30-gallon stirred reactors which were connected to operate in series (the reactor chain had a total chain volume of 150 gallons). The reactor chain was continuously operated at an actual running rate of 18.53 gallons per hour which provided an actual reaction time of 8.1 hours.

The monomer charge was split between the first reactor and the third reactor. The monomers were continuously fed into the first reactor at a rate of 29.6 pounds per hour and into the second reactor at a rate of 19.1 pounds per hour. The monomer charge employed contained 69 weight percent 1,3-butadiene and 31 weight percent styrene. An activator solution, a soap solution, a scavenger solution, a modifier, a secondary surfactant and an initiator were also continuously changed into the first reactor.

The activator solution was an aqueous solution containing 0.67 percent sodium ferric ethylenediaminetetraacetate. It was charged into the first reactor at a rate which was sufficient to maintain a 0.026 phm level of sodium ferric ethylenediaminetetraacetate. The secondard surfactant charged into the first reactor was an aqueous solution containing 0.503 phm of Witconate® 1223L, the sodium salt of a linear alkylbenzene sulfonic acid (from Witco Chemicals).

The soap solution charged into the first reactor contained 98.0 percent water, 0.25 percent potassium hydroxide, 0.13 percent potassium chloride, 0 percent of the potassium soap of disproportionated wood rosin, 1.18 percent hydrogenated mixed tallow fatty acids, 0.28 percent of the potassium soap of disproportionated tall oil rosin, 0.12 percent of the sodium salt of a condensed naphthalene sulfonic acid, 0.02 percent tetrapotassium pyrophosphate, 0.02 percent sodium formaldehyde sulfoxylate and 0.01 percent sodium hydrosulfite. The soap system solution was charged into the first reactor at a rate which was sufficient to maintain a 0.435 phm level of potassium hydroxide, a 0.230 phm level of potassium chloride, a 0 phm level of the potassium soap of disproportionated wood rosin, a 2.076 phm level of hydrogenated mixed tallow fatty acids, a 0.492 phm level of the potassium soap of disproportionated tall oil rosin, a 0.206 phm level of the sodium salt of a condensed naphthalene sulfonic acid, a 0.035 phm level of tetrapotassium pyrophosphate, a 0.035 phm level of sodium formaldehyde sulfoxylate and a 0.019 phm level of sodium hydrosulfite.

The scavenger solution contained 99.31 percent water, 0.096 percent sodium hydroxide and 0.60 percent sodium hydrosulfite. The scavenger solution was charged into the first reactor at a rate which was sufficient to maintain a 0.004 phm level of sodium hydroxide and a 0.026 phm level of sodium hydrosulfite (the total level of sodium hydrosulfite was 0.045 phm).

The modifier charged into the first reactor was t-dodecyl mercaptan. It was charged into the reactor at a rate of 0.137 phm. The initiator charged into the first reactor was pinane hydroperoxide and it was charged at a rate of 0.11 phm.

In this procedure, the polymerization was terminated by adding a mixture of diethylhydroxylamine and sodium dimethyldithiocarbamate to the latex as a shortstop after it exited the fifth reactor. The latex made by procedure was stable. The utilization of this technique results in the production of an emulsion SBR having a number average molecular weight of about 130,000 and a weight average molecular weight of about 490,000.

EXAMPLE 2

A low molecular weight emulsion SBR latex can be made by utilizing the technique described in Example 1 by simply increasing the level of t-dodecyl mercaptan to 0.39 phm. In this case, the number average molecular weight of the emulsion SBR produced will be about 60,000 and its weight average molecular weight will be about 185,000. Low molecular weight SBR latex having a low level of bound styrene can be made by adjusting the amount to styrene charged to a lower level. Using such a technique, a low molecular weight SBR containing 5 percent bound styrene can be synthesized.

EXAMPLE 3

A low molecular weight emulsion SBR latex having a high level of bound styrene can be made by utilizing the technique described in Example 1 by simply increasing the level of t-dodecyl mercaptan and styrene charged. Using such a technique, a low molecular weight SBR containing about 48 percent bound styrene was synthesized. A low molecular weight SBR synthesized using such a technique had a number average molecular weight of 56,000, a weight average molecular weight of 137,000 and a Mooney ML 1+4 viscosity of 11.4.

EXAMPLE 4

In this experiment, two styrene-butadiene (SBR) latices were synthesized by emulsion copolymerization of 1,3-butadiene monomer and styrene monomer in a continuous process. After polymerization, the latices were blended in a specific ratio.

A latex having a high Mooney ML 1+4 viscosity and medium bound styrene content was synthesized in a series of 13 continuous stirred-tank reactors (CSTRs). A styrene stream, a 1,3-butadiene stream and a modifier stream were mixed and fed into a Ligtnin static mixer having a diameter of about 3 inches (7.6 cm) and a length of about 30 inches (76 cm) prior to being split and fed into polymerization reactors. About 60 percent of this monomer/modifier stream was mixed with soft water and cooled in a heat exchanger to a temperature of about 52° F. (11° C.). An activator solution, soap solution, oxygen scavenger solution and initiator were added to the stream after it had exited the heat exchanger but before it entered into a second Ligtnin static mixer having a length of about 36 inches (91 cm) and a diameter of about 4 inches (10.2 cm). After this static mixer, the combined stream had a residence time of about 40 seconds in the tubular reactor before entering the first CSTR. The remaining 40 percent of the monomer/modifier stream was fed continuously into the fifth reactor in the chain. The reactor chain configuration is described in the following table:

| RV | Type | Vol (gal) | Pzm Temp (deg F.) | Impeller Type | Agitation Speed (rpm) |
|----|------|-----------|-------------------|---------------|------------------------|
| 0  | Tubular | 100 | 63 | | |
| 1  | CSTR | 5700 | 50 | Brumagin | 71 |
| 2  | CSTR | 5700 | 50 | Brumagin | 71 |
| 3  | CSTR | 5700 | 50 | Brumagin | 71 |
| 4  | CSTR | 5700 | 50 | Brumagin | 71 |
| 5  | CSTR | 5700 | 50 | Brumagin | 71 |
| 6  | CSTR | 5700 | 50 | Brumagin | 71 |
| 7  | CSTR | 5700 | 50 | Brumagin | 71 |
| 8  | CSTR | 5700 | 50 | Brumagin | 71 |
| 9  | CSTR | 5700 | 50 | Axial Flow Turbine | 71 |
| 10 | CSTR | 5700 | 50 | Axial Flow Turbine | 71 |
| 11 | CSTR | 5700 | 50 | Axial Flow Turbine | 71 |
| 12 | CSTR | 5700 | 50 | Axial Flow Turbine | 71 |
| 13 | CSTR | 5700 | 50 | Axial Flow Turbine | 71 |

The following streams were charged to this reactor configuration continuously:

| | Mass Flow Rate (lbs/min) | Stream Composition (%) |
|---|---|---|
| First Stage: Streams added to tubular reactor | | |
| Butadiene Monomer: | 209.65 | |
| 1,3-butadiene | | 90.00 |
| impurities | | 10.00 |
| (mixed butenes, isobutylene, 4-vinylcyclohexene, et al) | | |
| Styrene Monomer: | 85.93 | |
| Styrene | | 91.00 |
| Impurities | | 9.00 |
| (4-vinylcyclohexene, ethylbenzene, mixed xylenes, et al) | | |
| Soap Solution: | 124.25 | |
| soft water | | 79.33 |
| 45% aqueous solution of potassium hydroxide | | 2.04 |
| 40% aqueous solution of tripotassium phosphate | | 2.06 |
| 20% aqueous solution of sodium hydroxide | | 1.71 |
| mixed hydrogenated tallow fatty acid | | 8.21 |
| 47% aqueous solution of sodium napthelene sulfonate | | 1.70 |
| potassium soap of disproportionated tall oil rosin (80% active) | | 1.95 |
| 23% aqueous solution of sodium dodecylbenzene sulfonate | | 3.00 |
| Soft Water | 702.64 | 100.00 |
| Initiator: | 0.68 | |
| pinane hydroperoxide (44% active) | | 100.00 |
| Activator Solution: | 65.59 | |
| soft water | | 98.69 |
| 20% aqueous solution of ferrous sulfate | | 0.41 |
| 40% aqueous solution of tetrasodium ethylene-diaminetetraacetate | | 0.56 |
| sodium formaldehyde sulfoxylate | | 0.34 |
| Modifier (Chain Transfer Agent): | 0.29 | |
| tertiary dodecylmercaptan | | 100.00 |
| Oxygen Scavenger Solution: | 2.46 | |
| soft water | | 97.00 |
| sodium hydrosulfite | | 3.00 |
| Second Stage: Streams added to fifth CSTR | | |
| Butadiene Monomer: | 139.76 | |
| 1,3-butadiene | | 90.00 |
| impurities | | 10.00 |
| (mixed butenes, isobutylene, 4-vinylcyclohexene, et al) | | |
| Styrene Monomer: | 57.28 | |
| styrene | | 91.00 |
| impurities | | 9.00 |
| (4-vinylcyclohexene, ethylbenzene, mixed xylenes, et al) | | |
| Modifier (Chain Transfer Agent): | 0.20 | |
| tertiary dodecylmercaptan | | 100.00 |
| Shortstop: Added after 13th CSTR at 62% conversion (or 22.6% solids) | 42.56 | |
| soft water | | 97.08 |
| 85% aqueous solution of diethylhydroxylamine | | 0.38 |
| 40% aqueous solution of sodium dimethyldithiocarbamate | | 0.80 |
| 47% aqueous solution of sodium napthelene sulfonate | | 0.89 |
| 45% aqueous solution of potassium hydroxide | | 0.85 |

| | Mass Flow Rate (lbs/min) | Stream Composition (%) |
|---|---|---|
| Defoamer: Added to latex during monomer recovery operations | 0.30 | |
| soft water | | 50.00 |
| Nalco-Exxon EC9060A defoamer | | 50.00 |

The latex made was continuously removed from the thirteenth reactor and passed through a filter to remove coagulum. The filter consisted of a basket strainer having holes with a diameter of about ⅜ inch (9.5 mm). The latex was then passed through blow-down tanks for recovery of residual 1,3-butadiene monomer. The defoamer identified in the table above was added to the stream after it exited the blow-down tanks. The latex stream was then passed through a first flash tank with a vacuum of about 3–5 psig ($1.2 \times 10^5$ Pa to $1.4 \times 10^5$ Pa) being applied. It was subsequently passed through a second flash tank with a vacuum of about 22 inches of mercury ($7.4 \times 10^4$ Pa) being applied. The latex then went through a 12-tray steam-stripping column with about 15 psig of steam being injected into the bottom of the column and a vacuum of about 22 inches of mercury ($7.4 \times 10^4$ Pa) being applied to the top of the column. After unreacted monomers were removed from this stable latex by steam-stripping, it was found to have a solids content of 20.8 percent, a 23.4 percent bound styrene content and a Mooney ML 1+4 viscosity of 105. The latex was stored in a storage tank having a capacity of about 45,000 gallons after it had passed through the steam-stripping column.

A second latex having a low Mooney ML 1+4 viscosity and a high bound styrene content was also synthesized in a reactor system similar to the one used in making the high viscosity latex. The reactor chain configuration used in synthesizing the low viscosity latex is described in the following table:

| RV | Type | Vol (gal) | Pzm Temp (deg F.) | Impeller Type | Agitation Speed (rpm) |
|---|---|---|---|---|---|
| 0 | Tubular | 150 | 63 | | |
| 1 | CSTR | 3750 | 50 | Axial Flow Turbine | 107 |
| 2 | CSTR | 3750 | 50 | Axial Flow Turbine | 107 |
| 3 | CSTR | 3750 | 50 | Brumagin | 71 |
| 4 | CSTR | 7500 | 50 | Brumagin | 71 |
| 5 | CSTR | 7500 | 50 | Brumagin | 71 |
| 6 | CSTR | 3750 | 50 | Axial Flow Turbine | 107 |
| 7 | CSTR | 3750 | 50 | Axial Flow Turbine | 107 |
| 8 | CSTR | 3750 | 50 | Axial Flow Turbine | 107 |
| 9 | CSTR | 3750 | 50 | Axial Flow Turbine | 107 |

The following streams were charged to this reactor configuration continuously:

| | Mass Flow Rate (lbs/min) | Stream Composition (%) |
|---|---|---|
| First Stage: Streams added to tubular reactor | | |
| Butadiene Monomer: | 38.02 | |
| 1,3-butadiene | | 90.00 |
| impurities (mixed butenes, isobutylene, 4-vinylcyclohexene, et al) | | 10.00 |
| Styrene Monomer: | 54.10 | |
| Styrene | | 91.00 |
| Impurities (4-vinylcyclohexene, ethylbenzene, mixed xylenes, et al) | | 9.00 |
| Soap Solution: | 40.62 | |
| soft water | | 79.33 |
| 45% aqueous solution of potassium hydroxide | | 2.04 |
| 40% aqueous solution of tripotassium phosphate | | 2.06 |
| 20% aqueous solution of sodium hydroxide | | 1.71 |
| mixed hydrogenated tallow fatty acid | | 8.21 |
| 47% aqueous solution of sodium napthelene sulfonate | | 1.70 |
| potassium soap of disproportionated tall oil rosin (80% active) | | 1.95 |
| 23% aqueous solution of sodium dodecylbenzene sulfonate | | 3.00 |
| Soft Water | 217.15 | 100.00 |
| Initiator: | 0.20 | |
| pinane hydroperoxide (44% active) | | 100.00 |
| Activator Solution: | 17.68 | |
| soft water | | 98.69 |
| 20% aqueous solution of ferrous sulfate | | 0.41 |
| 40% aqueous solution of tetrasodium ethylene-diaminetetraacetate | | 0.56 |
| sodium formaldehyde sulfoxylate | | 0.34 |
| Modifier (Chain Transfer Agent): | 0.19 | |
| tertiary dodecylmercaptan | | 100.00 |
| Oxygen Scavenger Solution: | 0.65 | |
| soft water | | 97.00 |
| sodium hydrosulfite | | 3.00 |
| Second Stage: Streams added to third CSTR | | |
| Butadiene Monomer: | 25.34 | |
| 1,3-butadiene | | 90.00 |
| impurities (mixed butenes, isabutylene, 4-vinylcyclohexene, et al) | | 10.00 |
| Styrene Monomer: | 36.07 | |
| styrene | | 91.00 |
| impurities (4-vinylcyclohexene, ethylbenzene, mixed xylenes, et al) | | 9.00 |
| Modifier (Chain Transfer Agent): | 0.12 | |
| tertiary dodecylmercaptan | | 100.00 |
| Shortstop: Added after 9th CSTR at 62% conversion (or 21.6% solids) | 13.31 | |
| soft water | | 97.08 |

-continued

| | Mass Flow Rate (lbs/min) | Stream Composition (%) |
|---|---|---|
| 85% aqueous solution of diethylhydroxylamine | | 0.38 |
| 40% aqueous solution of sodium dimethyldithiocarbamate | | 0.80 |
| 47% aqueous solution of sodium napthelene sulfonate | | 0.89 |
| 45% aqueous solution of potassium hydroxide | | 0.85 |
| Defoamer: Added to latex during monomer recovery operations | 0.05 | |
| Nalco-Exxon EC9060A defoamer | | 100.00 |

After unreacted monomers were removed from this stable latex by steam-stripping, it was found to have a solids content of 20.5 percent, a 50.6 percent bound styrene content and a Mooney ML 1+4 viscosity of 13.

A blend of 222,646 lbs (100992 kg) of the high viscosity latex and 184,828 lbs (83,838 kg) of the low viscosity latex (55 percent:45 percent dry weight blend) was made in an agitated tank. Added to the latex blend was 2105 lbs (955 kg) of a 50 percent active Goodyear Wingstay® C antioxidant emulsion.

EXAMPLES 5–9

In this series of experiments, various latices were evaluated as modifiers for Koch AC-10 asphalt. Example 5 was carried out as a control and was not modified with latex. Example 6 was also carried out as a control wherein the asphalt cement was modified with Pliolite® 7576 SBR latex. Pliolite® 7576 latex has a solids content of about 69 percent. The SBR in Pliolite® 7576 latex has a bound styrene content of 23.5 percent and a Mooney ML/4 viscosity of within the range of 45 to 65.

The asphalt cement of Example 7 was modified with an SBR latex made by blending 50 parts of an SBR latex having a bound styrene content of 23.5 percent, a number average molecular weight of about 130,000 and a weight average molecular weight of about 490,000, and 50 parts of a low molecular weight SBR latex having a bound styrene content of about 48 percent, a number average molecular weight of 56,000, a weight average molecular weight of 137,000 and a Mooney ML 1+4 viscosity of 11.4. In Example 8, the SBR latex blend evaluated in Example 7 was further evaluated except that 2 phr (parts per hundred parts of rubber) of sulfur was additionally added to the asphalt.

In the procedure used, the latices being evaluated were slowly added to hot asphalt cement at 340° F.–350° F. (171° C.–177° C.) under propeller agitation at moderate speeds. The latices were added in amounts sufficient to attain a dry weight of rubbery polymer in the asphalt cements of 3 percent. The modified asphalt cements were then stirred for about 2 hours at a temperature of about 163° C. (325° F.).

The physical properties of the modified asphalt cements made were then determined using standard test procedures. The strength and flexibility of the asphalt binder cement at moderate or low temperatures are measured by force ductility, toughness and tenacity. These properties measure the resistance to deformation. Increasing strength and toughness gives greater resistance to surface abrasion and wear and provides better retention of aggregate. Force ductility was determined by a procedure based upon ASTM D113 whereby a force measuring apparatus was used to measure the force exerted on the specimen as it was being stretched at a temperature of 4° C. and a pulling rate of 5 cm per minute. In particular, the force ductility value in pounds force was recorded at 800 percent and 1000 percent elongation.

Compatibility was determined by utilizing a separation test wherein the modified asphalt sample was placed in a tube having a diameter of 1 inch (2.54 cm) and a length of 5.5 inches (14 cm) and heated in an oven at 325° F. (163° C.) for 48 hours. The tube was maintained in a vertical position throughout the heating step. The tube containing the asphalt sample was then placed in a freezer at about 20° F. (−7° C.) for a minimum time period of 4 hours. Then, the sample was removed from the freezer and cut into three portions of equal length. The ring and ball softening point of the top and bottom portions of the sample was then determined by ASTM Method D36. Compatibility is reported as the temperature difference between the softening points of the top and bottom samples. Compatibility is considered to be excellent in cases where the difference in temperatures between the softening points between the top and bottom samples is no greater than 2° C. The absolute viscosities of the modified asphalts shown in Table I were carried out at a temperature of 60° C. The ductility, toughness, tenacity and compatibility of the modified asphalt cements are reported in Table I. Forced ductility was determined at a temperature of 4° C. with toughness and tenacity being determined at a temperature of 25° C.

TABLE I

| Example | 5 | 6 | 7 | 8 |
|---|---|---|---|---|
| Absolute Viscosity, poise | 1182 | 1968 | 2122 | 1905 |
| Force Ductility @ 800%, lbs | 0.45 | 1.73 | 3.47 | 5.21 |
| Force Ductility @ 1000%, lbs | broke | 1.68 | 3.61 | 5.53 |
| Toughness, lb-in | 51.6 | 76.2 | 153.1 | 144.7 |
| Tenacity, lb-in | 17.2 | 46.0 | 116.3 | 112.7 |
| Compatibility, Δ° C. | — | 0.1 | 0.2 | 0.5 |

Table I shows that asphalt cements can be modified with the SBR compositions described herein to improve compatibility, force ductility, toughness and tenacity (see Examples 7 and 8). This is in contrast to the utilization of standard high Mooney polymers which are capable of improving force ductility, toughness and tenacity but which are not very compatible with asphalt. It is also in contrast to the employment of standard latices of low Mooney viscosity polymers which are compatible with asphalt but which do not provide significant improvements in force ductility, toughness and tenacity.

In asphalt pavements, improved force ductility, toughness and tenacity translate into improved resistance to rutting and shoving. Increasing strength and toughness gives greater resistance to surface abrasion and wear and provides better retention of aggregate. It is accordingly important for the latex utilized in modifying asphalt cements to be compatible with the asphalt and for it to improve force ductility, toughness and tenacity. This highly desirable combination of properties is attained in Examples 7 and 8 which utilize the techniques of this invention.

While certain representative embodiments and details have been shown for the purpose of illustrating the subject invention, it will be apparent to those skilled in this art that various changes and modifications can be made therein without departing from the scope of the subject invention.

What is claimed is:

1. An asphalt concrete which is comprised of (A) from about 90 weight percent to about 99 weight percent of an aggregate and (B) from about 1 weight percent to about 10 weight percent of a modified asphalt cement which is comprised of (1) from about 90 weight percent to about 99 weight percent of asphalt; and (2) from about 1 weight percent to about 10 weight percent of a rubbery polymer which is comprised of repeat units which are derived from styrene and 1,3-butadiene, wherein the styrene-butadiene rubber composition has a number average molecular weight as determined by field flow fractionation which is within the range of about 50,000 to 150,000 and wherein the styrene-butadiene rubber has a light scattering to refractive index ratio which is within the range of 1.8 to 3.9.

2. An asphalt concrete which is comprised of (A) from about 90 weight percent to about 99 weight percent of an aggregate and (B) from about 1 weight percent to about 10 weight percent of a modified asphalt cement which is comprised of (1) from about 90 weight percent to about 99 weight percent of asphalt; and (2) from about 1 weight percent to about 10 weight percent of a rubbery polymer which is comprised of repeat units which are derived from styrene and 1,3-butadiene, wherein a plot of log frequency versus elastic modulus of the styrene-butadiene rubber composition crosses over a plot of log frequency versus loss modulus of the styrene-butadiene rubber composition at a frequency within the range of 0.001 radians per second to 100 radians per second when conducted at 90° C. to 120° C. using parallel plate geometry in the dynamic oscillation frequency sweep of the styrene-butadiene rubber.

3. An asphalt concrete which is comprised of (A) from about 90 weight percent to about 99 weight percent of an aggregate and (B) from about 1 weight percent to about 10 weight percent of a modified asphalt cement which is comprised of (1) from about 90 weight percent to about 99 weight percent of asphalt; and (2) from about 1 weight percent to about 10 weight percent of a rubbery polymer which is comprised of a blend of (i) a high molecular weight styrene-butadiene rubber having a weight average molecular weight of at least about 300,000 and (ii) a low molecular weight styrene-butadiene rubber having a weight average molecular weight of less than about 280,000; wherein the ratio of the high molecular weight styrene-butadiene rubber to the low molecular weight styrene-butadiene rubber is within the range of about 80:20 to about 25:75; and wherein the bound styrene content of the high molecular weight styrene-butadiene rubber differs from the bound styrene content of the low molecular weight styrene-butadiene rubber by at least 5 percentage points.

4. A modified asphalt cement which is comprised of (1) from about 90 weight percent to about 99 weight percent of asphalt; and (2) from about 1 weight percent to about 10 weight percent of a rubbery polymer which is comprised of repeat units which are derived from styrene and 1,3-butadiene, wherein the styrene-butadiene rubber composition has a number average molecular weight as determined by field flow fractionation which is within the range of about 50,000 to 150,000 and wherein the styrene-butadiene rubber has a light scattering to refractive index ratio which is within the range of 1.8 to 3.9.

5. A modified asphalt cement which is comprised of (1) from about 90 weight percent to about 99 weight percent of asphalt; and (2) from about 1 weight percent to about 10 weight percent of a rubbery polymer which is comprised of repeat units which are derived from styrene and 1,3-butadiene, wherein a plot of log frequency versus elastic modulus of the styrene-butadiene rubber composition crosses over a plot of log frequency versus loss modulus of the styrene-butadiene rubber composition at a frequency within the range of 0.001 radians per second to 100 radians per second when conducted at 90° C. to 120° C. using parallel plate geometry in the dynamic oscillation frequency sweep of the styrene-butadiene rubber.

6. A modified asphalt cement which is comprised of (1) from about 90 weight percent to about 99 weight percent of asphalt; and (2) from about 1 weight percent to about 10 weight percent of a blend of (i) a high molecular weight styrene-butadiene rubber having a weight average molecular weight of at least about 300,000 and (ii) a low molecular weight styrene-butadiene rubber having a weight average molecular weight of less than about 280,000; wherein the ratio of the high molecular weight styrene-butadiene rubber to the low molecular weight styrene-butadiene rubber is within the range of about 80:20 to about 25:75; and wherein the bound styrene content of the high molecular weight styrene-butadiene rubber differs from the bound styrene content of the low molecular weight styrene-butadiene rubber by at least 5 percentage points.

7. An asphalt concrete as specified in claim 1 wherein the number average molecular weight as determined by field flow fractionation which is within the range of about 60,000 to 145,000.

8. An asphalt concrete as specified in claim 7 wherein the styrene-butadiene rubber has a light scattering to refractive index ratio which is within the range of 2.0 to 3.8.

9. An asphalt concrete as specified in claim 8 wherein the number average molecular weight as determined by field flow fractionation which is within the range of about 75,000 to 140,000.

10. An asphalt concrete as specified in claim 9 wherein the styrene-butadiene rubber has a light scattering to refractive index ratio which is within the range of 2.1 to 3.7.

11. An asphalt concrete as specified in claim 10 wherein the number average molecular weight as determined by field flow fractionation which is within the range of about 90,000 to 135,000.

12. An asphalt concrete as specified in claim 11 wherein the styrene-butadiene rubber has a light scattering to refractive index ratio which is within the range of 2.2 to 3.0.

13. An asphalt concrete as specified in claim 12 wherein a plot of log frequency versus elastic modulus of the styrene-butadiene rubber composition crosses over a plot of log frequency versus loss modulus of the styrene-butadiene rubber composition at a frequency within the range of 0.001 radians per second to 100 radians per second when conducted at 90° C. to 120° C. using parallel plate geometry in the dynamic oscillation frequency sweep of the styrene-butadiene rubber.

14. An asphalt concrete as specified in claim 7 wherein the modified asphalt cement is comprised of (1) from about 94 weight percent to about 99 weight percent of the asphalt and (2) from about 1 weight percent to about 6 weight percent of the rubbery polymer.

15. An asphalt concrete as specified in claim 9 wherein the modified asphalt cement is comprised of (1) from about 96 weight percent to about 98 weight percent of the asphalt and (2) from about 2 weight percent to about 4 weight percent of the rubbery polymer.

16. An asphalt concrete as specified in claim 10 wherein said asphalt concrete is comprised of (A) from about 92 weight percent to about 97 weight percent of the aggregate and (B) from about 3 weight percent to about 8 weight percent of the modified asphalt cement.

17. A pavement which is made utilizing the asphalt concrete specified in claim 1.

18. A pavement which is made utilizing the asphalt concrete specified in claim 3.

19. An asphalt concrete as specified in claim 13 wherein the plot of log frequency versus elastic modulus crosses over a plot of log frequency versus loss modulus at a frequency within the range of 0.001 radians per second to 10 radians per second.

20. An asphalt concrete as specified in claim 19 wherein the plot of log frequency versus elastic modulus crosses over a plot of log frequency versus loss modulus at a frequency within the range of 0.01 radians per second to 5 radians per second.

21. An asphalt concrete as specified in claim 20 wherein the plot of log frequency versus elastic modulus crosses over a plot of log frequency versus loss modulus at a frequency within the range of 0.05 radians per second to 1 radians per second.

22. An asphalt concrete as specified in claim 21 wherein the elastic modulus is less than the loss modulus at a frequency of 0.1 radians per second and wherein the elastic modulus is greater than the loss modulus at a frequency of 100 radians per second.

23. An asphalt concrete as specified in claim 2 wherein the plot of log frequency versus elastic modulus crosses over a plot of log frequency versus loss modulus at a frequency within the range of 0.001 radians per second to 10 radians per second.

24. An asphalt concrete as specified in claim 23 wherein the plot of log frequency versus elastic modulus crosses over a plot of log frequency versus loss modulus at a frequency within the range of 0.01 radians per second to 5 radians per second.

25. An asphalt concrete as specified in claim 24 wherein the plot of log frequency versus elastic modulus crosses over a plot of log frequency versus loss modulus at a frequency within the range of 0.05 radians per second to 1 radians per second.

26. An asphalt concrete as specified in claim 25 wherein the elastic modulus is less than the loss modulus at a frequency of 0.1 radians per second and wherein the elastic modulus is greater than the loss modulus at a frequency of 100 radians per second.

27. An asphalt concrete as specified in claim 3 wherein the bound styrene content of the high molecular weight styrene-butadiene rubber differs from the bound styrene content of the low molecular weight styrene-butadiene rubber by at least 10 percentage points.

28. An asphalt concrete as specified in claim 3 wherein the high molecular weight styrene-butadiene rubber has a weight average molecular weight which is within the range of about 400,000 to about 1,750,000 and wherein the low molecular weight styrene-butadiene rubber has a weight average molecular weight which is within the range of about 70,000 to about 270,000.

29. An asphalt concrete as specified in claim 28 wherein the bound styrene content of the high molecular weight styrene-butadiene rubber differs from the bound styrene content of the low molecular weight styrene-butadiene rubber by at least 15 percentage points.

30. An asphalt concrete as specified in claim 29 wherein the high molecular weight styrene-butadiene rubber has a weight average molecular weight which is within the range of about 1,000,000 to about 1,500,000 and wherein the low molecular weight styrene-butadiene rubber has a weight average molecular weight which is within the range of about 120,000 to about 260,000.

31. An asphalt concrete as specified in claim 30 wherein the weight ratio of the high molecular weight styrene-butadiene rubber to the low molecular weight styrene-butadiene rubber is within the range of about 70:30 to about 30:70.

32. An asphalt concrete as specified in claim 30 wherein the weight ratio of the high molecular weight styrene-butadiene rubber to the low molecular weight styrene-butadiene rubber is within the range of about 60:40 to about 40:60.

* * * * *